United States Patent
Shah et al.

(10) Patent No.: US 8,284,758 B2
(45) Date of Patent: Oct. 9, 2012

(54) PATH DIVERSITY INDEX FOR USE IN ROUTE SELECTION

(75) Inventors: Pritam Shah, Brookline, MA (US); Philip Jacobs, Windham, NH (US); Rahul Patel, Nashua, NH (US); Dana Blair, Alpharetta, GA (US)

(73) Assignee: Cisco Technology, Inc., San Jose, CA (US)

( * ) Notice: Subject to any disclaimer, the term of this patent is extended or adjusted under 35 U.S.C. 154(b) by 1325 days.

(21) Appl. No.: 11/825,893

(22) Filed: Jul. 10, 2007

(65) Prior Publication Data

US 2009/0016331 A1    Jan. 15, 2009

(51) Int. Cl.
*H04L 12/28* (2006.01)
(52) U.S. Cl. ........ 370/351; 370/230; 370/235; 370/400; 370/401; 709/239
(58) Field of Classification Search .................. 370/254, 370/351, 389, 392, 400, 401
See application file for complete search history.

(56) References Cited

U.S. PATENT DOCUMENTS

| | | | | |
|---|---|---|---|---|
| 6,944,131 B2 * | 9/2005 | Beshai et al. | ............. | 370/238.1 |
| 2003/0202506 A1 * | 10/2003 | Perkins et al. | ................ | 370/352 |

OTHER PUBLICATIONS

"Cisco IOS Optimized Edge Routing Overview", Cisco Technology, INC., Jan. 29, 2007.

* cited by examiner

*Primary Examiner* — Bob Phunkulh
*Assistant Examiner* — Jenkey Van
(74) *Attorney, Agent, or Firm* — Cindy Kaplan

(57) ABSTRACT

In one embodiment, a method includes receiving at a network device information on paths to a destination node, determining a number of common nodes or links between at least two of the paths, calculating a path diversity index based on the number of common nodes or links, and selecting a route to the destination node based on the path diversity index. An apparatus for calculating path diversity index for use in route selection is also disclosed.

17 Claims, 5 Drawing Sheets

PATH DIVERSITY INDEX FOR USE IN ROUTE SELECTION

BACKGROUND OF THE INVENTION

The present disclosure relates generally to path diversity calculations for use in route selection.

A network typically includes multiple paths to a destination to increase the probability of reaching the destination. However, if multiple paths share a significant number of common nodes or links, then a single failure may impact all paths. Path diversity describes the number of disjoint paths between a pair of nodes in a network topology. The number of disjoint paths between the nodes depends on where and how they connect to the network. Path diversity of a network directly impacts its resilience to failure. The spread of information transfer within the network over divergent paths minimizes the impact of a single failure.

Paths between two hosts in the same autonomous system (AS) are determined by the AS's internal network infrastructure and by the intra-domain routing protocol. Paths between two nodes connected to different autonomous systems are determined not only by the network infrastructure and routing policies inside each network on the path, but also by peering connections and inter-domain routing policies. Path diversity is desirable to mitigate the impact of a failure, however, utilization of path diversity in route selection is typically limited by these routing protocols and policies.

DESCRIPTION OF EXAMPLE EMBODIMENTS

Overview

Figure 1:
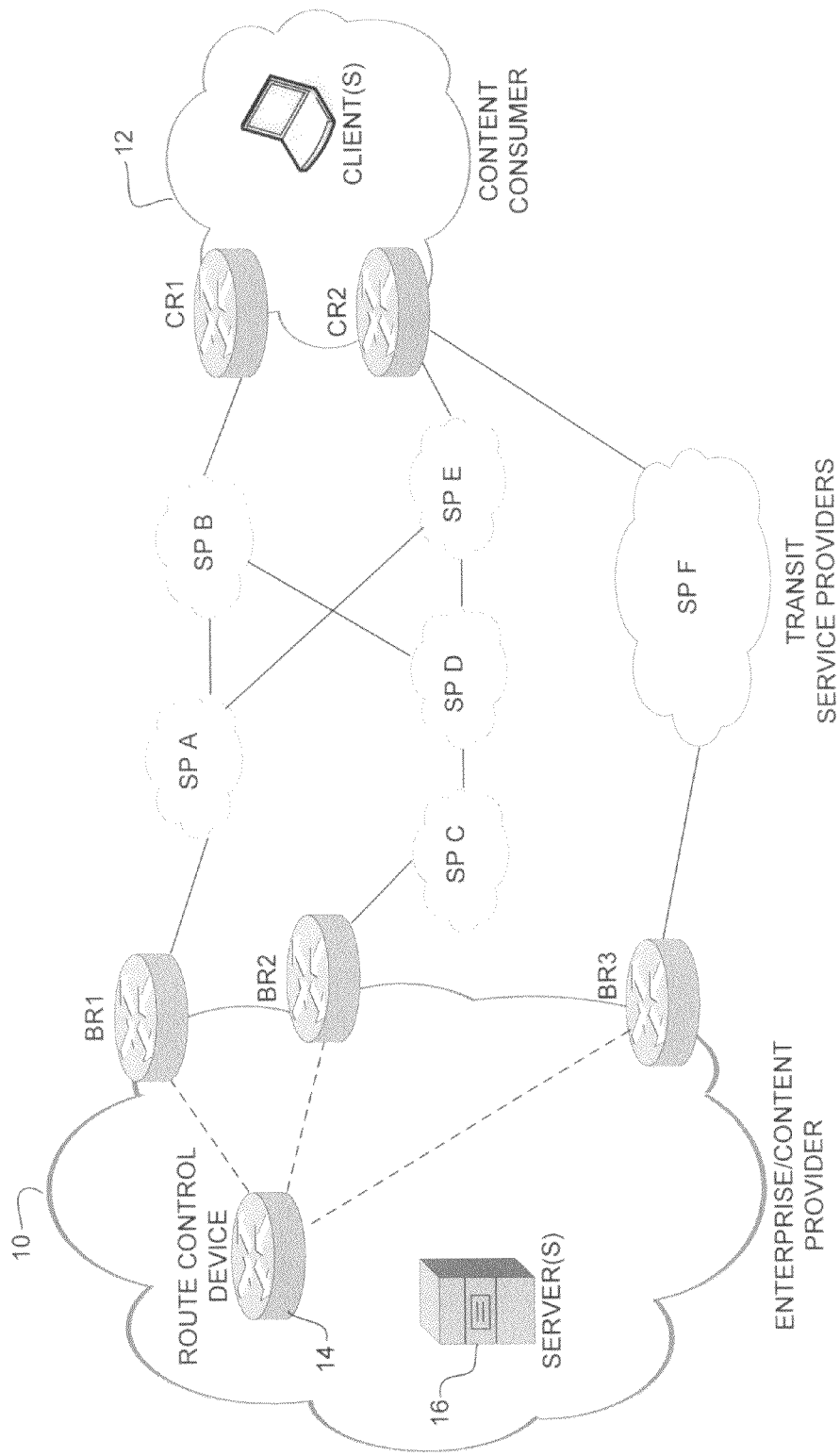
FIG. 1 illustrates an example of a network in which embodiments described herein may be implemented.

A method and apparatus for path diversity calculation for use in route selection are disclosed. In one embodiment, a method generally comprises receiving at a network device information on paths to a destination node, determining a number of common nodes or links between at least two of the paths, calculating a path diversity index based on the number of common nodes or links, and selecting a route to the destination node based on the path diversity index.

In another embodiment, an apparatus generally comprises a processor operable to receive information about paths between a source node and a destination node, determine a number of common nodes or links between at least two of said paths, calculate a path diversity index based on the number of common nodes or links, and select a route between the source node and the destination node based on the path diversity index. The apparatus further comprises memory for storing path information and the path diversity index.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A method and system described herein may be used to determine path diversity and select one or more optimum routes based on path diversity. A path diversity index (PDI) is used to describe node and link commonality and characterize the path diversity of different paths between a pair of nodes in a network topology. As described in detail below, the path diversity index provides a normalized value that can be used to determine the diversity of paths so that overall redundancy can be measured and polices can be defined to enforce diversity. The index described herein may be used to compare two or more paths which have the same or different lengths.

In one embodiment, the path diversity index (PDI) compares two or more paths and provides a network wide diversity measurement to indicate an overall susceptibility to failures in the network. The path diversity index may be used, for example, as a metric to measure diversity in service provider networks. PDIs can be compared and used to select the network having the most diverse paths. The path diversity index may also be plotted to a single destination over all paths to indicate overall path diversity.

In another embodiment, the path diversity index (referred to herein as relative path diversity index (RPDI)) provides a metric for use in selecting the most diverse path with respect to a current path. For example, RPDI may be used in selection of routes based on existing paths. RPDI may be used to select one path over one or more other paths, or to select multiple alternate paths. Examples of PDI and RPDI calculations are described in detail below.

In one embodiment, path diversity calculations may be used in performance based routing such as route control. Route control provides automatic route optimization and load distribution for multiple connections between networks. Route control may be used, for example, to monitor traffic flows and define policies and rules based on traffic class performance, link load distribution, link bandwidth monetary cost, and traffic type. The path diversity index may be used along with these or other parameters in route selection. For example, in a network with three or more paths, if a prefix is out of policy range on its current path and the other two paths are equivalent based on all other metrics, the path with the highest RPDI as compared to the current path is selected. Also, when flow based load balancing a single prefix, the load may be balanced over paths with the most diversity to minimize the impact of a failure. It is to be understood that the parameters described above are only examples, and that other parameters may be used along with RPDI in selecting a path.

Referring now to the drawings, and first to FIG. 1, an example of a network that may implement embodiments described herein is shown. The system operates in the context of a data communication network including multiple network elements. Some of the elements in a network that employs the system may be network devices such as routers, switches, gateways, or servers. The network device may include, for example, a master central processing unit (CPU), interfaces, and a bus. The CPU preferably includes memory and a processor. The network device may be implemented on a general purpose network machine such as described below with respect to FIG. 5.

FIG. 1 illustrates an example of an enterprise network 10 of a content provider configured for route control. The enterprise network 10 includes three exit interfaces (border routers BR1, BR2, BR3) that are used to deliver content to customer access network 12. The enterprise network 10 also includes a route control device 14 and one or more servers 16. The customer access network 12 has two edge routers (CR1, CR2) that connect to the Internet. The border routers BR1, BR2, BR3 may be, for example, enterprise edge routers with one or more exit links to an ISP (Internet Service Provider) or other participating network. The content provider may have a separate service level agreement (SLA) with a different ISP for each link. In the example of FIG. 1, traffic is carried between the enterprise network 10 and the customer access network 12 over six service providers (SP) networks SP A, SP B, SP C, SP D, SP E, SP F.

In the example of FIG. 1, the route control device 14 monitors and controls outbound traffic on the three border routers (BR1, BR2, BR3). The route control device 14 does not need to be in the traffic forwarding path, but it should be reachable by the border routers (e.g., in communication, either directly or indirectly, with the border routers). Measurements are collected on the border routers BR1, BR2, BR3 and then transmitted to the route control device 14. The route control device 14 is configured to send commands to the border routers to dynamically alter routing inside the enterprise network 10.

In one embodiment, the path information used in path diversity calculations is collected at the border routers (BR1, BR2, BR3) and transmitted to the route control device 14. For example, BR1 identifies all paths between BR1 (source node) and CR1 (destination node). BR1 then sends the path information to the route control device 14 for calculation of one or more path diversity indices. The path diversity indices can then used by the route control device 14 in route selection.

It is to be understood that the network shown in FIG. 1 and described above is only one example in which embodiments described herein may be implemented, and other network configurations and devices may be used, without departing from the scope of the invention. For example, path diversity calculations may be performed at the source node rather than another network device.

Various route tracing methods may be used to identify paths within the network, as is well known by those skilled in the art. In one embodiment, a tool such as traceroute is used to identify a path taken by traffic over a network. Traceroute is used to trace the route of a packet over each node from a source node to a destination node by reporting all router addresses therebetween using Internet Protocol (IP) packets. In a first IP packet, a Time to Live (TTL) field is set to 1. Whenever an IP packet reaches a router, the TTL field is decremented by the router. When a router detects that the TTL value has reached 0, it sends an Internet Control Message Protocol (ICMP) time exceeded or timeout message back to the source node. By sequentially increasing the TTL field and monitoring the returning ICMP timeout messages, a source node can discover an IP route. It is to be understood that traceroute is only one example and that other methods may be used to identify a network path, including methods that identify transparent network proxies or redirections within a path.

Route tracing results may provide IP addresses, AS (autonomous system) numbers, or DNS (domain name system) identifiers, for example. Results that provide the IP address at each node are used to calculate node or link diversity. Results that provide the AS number for each node are used to calculate AS diversity, which may be used in place of path diversity. Results that provide the DNS name for each node provide a measure of node diversity if a standard naming convention that can identify the router at each node is used.

Figure 2:
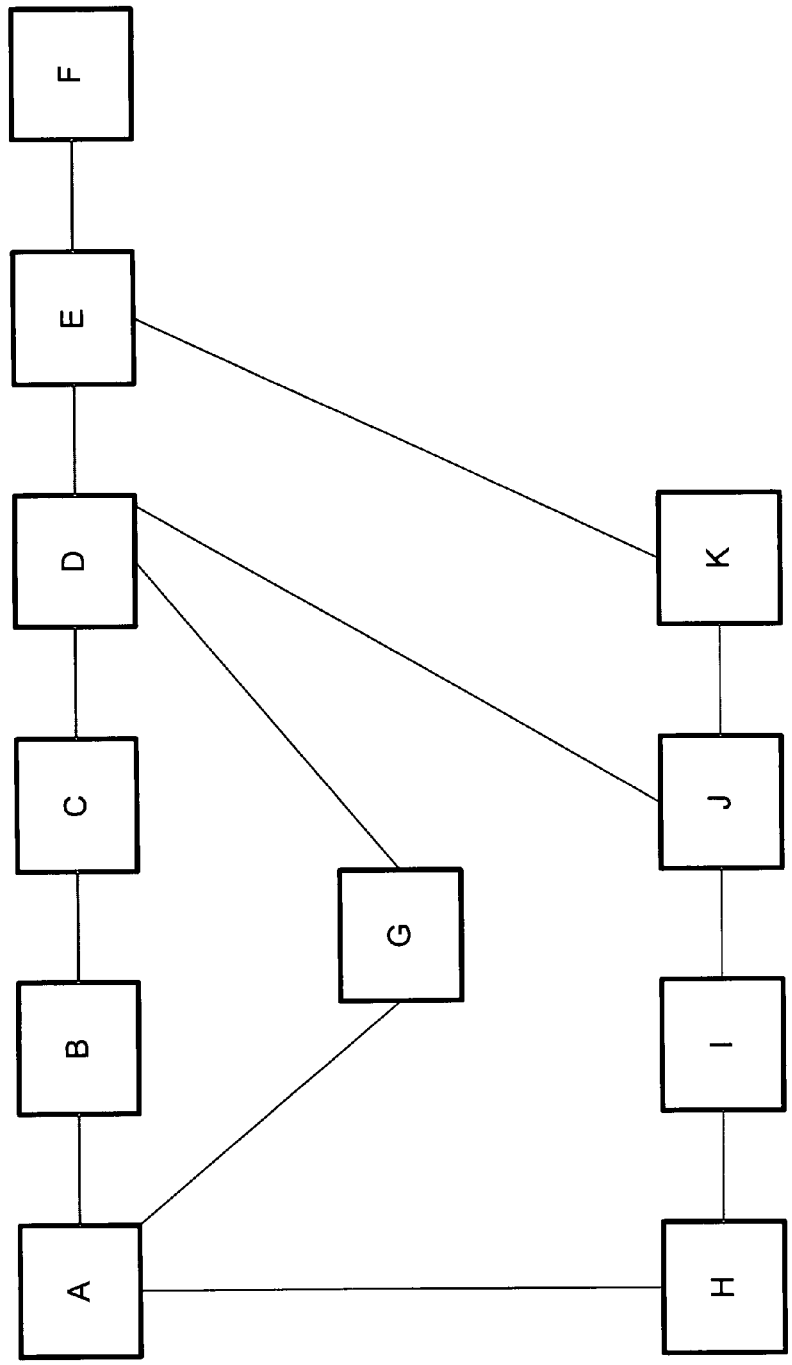
FIG. 2 illustrates four network paths for use in sample calculations of path diversity according to embodiments described herein.

FIG. 2 illustrates an example of four network paths (path 1, path 2, path 3, path 4) having a common source (node A) and a common destination (node F). Nodes may be physical devices or virtual nodes. The network nodes may be, for example, routers connected by a plurality of links. Each path starts at source node A and ends at destination node F. As shown in the path descriptions on FIG. 2, path 1 passes through nodes, B, C, D, and E; path 2 passes through nodes G, D, and E; path 3 passes through nodes H, I, J, D, and E; and path 4 passes through nodes H, I, J, K, and E. Path 1 includes 6 nodes and 5 links (A->B, B->C, C->D, D->E, and E->F). Path 2 includes 5 nodes and 4 links (A->G, G->D, D->E, E->F). Path 3 includes 7 nodes and 6 links (A->H, H->I, I->J, J->D, D->E, E->F). Path 4 includes 7 nodes and 6 links (A>H, H->I, I->J, J->K, K->E, E->F). Path diversity calculations are described below using these example paths.

Figure 3:
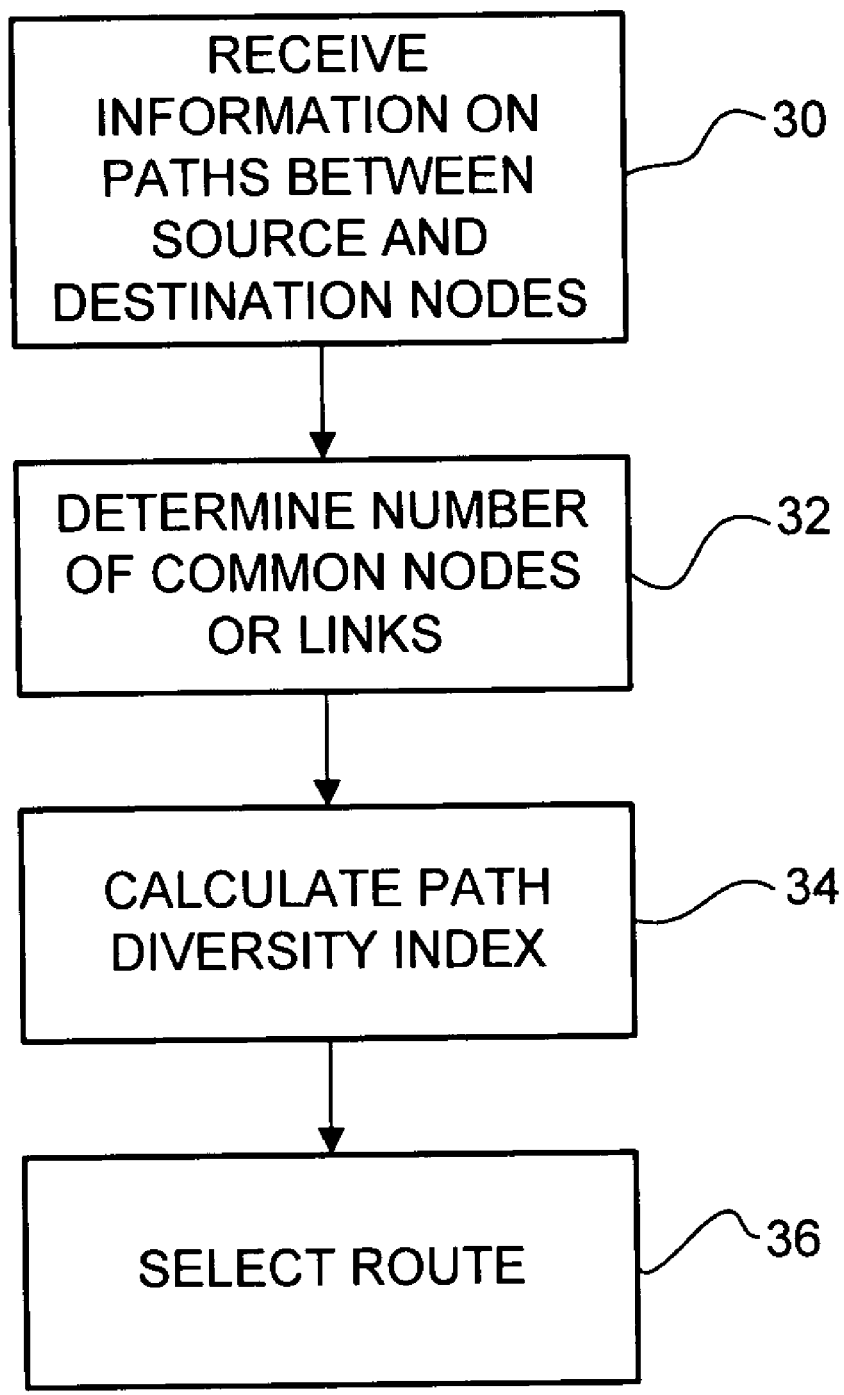
FIG. 3 is a flowchart illustrating a process for determining path diversity and selecting a route based thereon, according to one embodiment.

FIG. 3 is a flowchart illustrating a process according to one embodiment for determining a path diversity index and selecting a route based on the index. At step 30 a network device receives information on paths between a source node and a destination node. In the example of FIG. 1, the route control device 14 receives the path information from the border routers. The path information is used to determine the number of common nodes or links between one or more combinations of paths (step 32). As described below, the number of common nodes or links may be determined for each combination of paths (e.g., comparing two paths at a time) or for only combinations of a first path with all other paths. The determination of the number of common nodes or links is preferably made at the route control device, but can also be made at the border router, and sent to the route control device, for example. At step 34 the route control device calculates the path diversity index (or indices) and selects a route based thereon (step 36).

Figure 4:
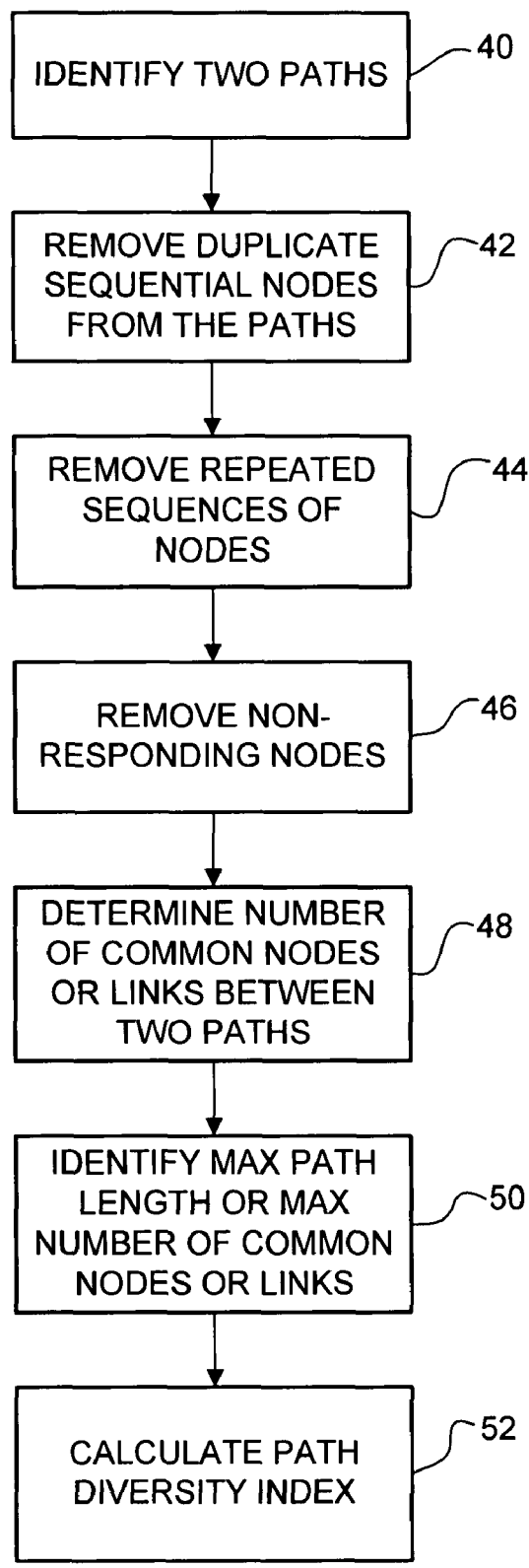
FIG. 4 is a flowchart illustrating a process for calculating a path diversity index, according to one embodiment.

FIG. 4 is a flowchart illustrating details of path diversity index calculation for two paths, according to one embodiment. At step 40, two paths (Pi, Pj) are identified. Duplicate sequential nodes are removed from the paths (step 42). Repeated sequences of nodes (routing loops) are also removed from each path (step 44). Any non-responding nodes are removed from each path (step 46). At step 48, the number of nodes or links which are the same between the two paths (CH (Pi, Pj)) is determined. The maximum path length (MaxPathLength (Pi, Pj)) of the two paths is then identified, or the maximum number of common nodes or links (Max (CH(Pi, P1), CH(Pi, P2), . . . CH(Pi, Pn))) is identified (step 50). PDI is then calculated at step 52.

Path diversity calculations may be performed based on the number of common nodes, links, or both nodes and links. The following provides examples of path diversity calculations based on node diversity ($PDI_n$, $RPDI_n$) and link diversity ($PDI_l$, $RPDI_l$). In the node diversity example below, the source nodes are not included in the calculation. However, node diversity may also be calculated using all nodes in a path, or excluding the destination node or both the source and destination nodes, for example.

The following describes details of path diversity calculation, in accordance with one embodiment. In the following example, calculations are performed based on node diversity. In this embodiment, PDI and RPDI have a range from zero to one. A value of one indicates that the paths have no nodes or links in common. A value of zero indicates that all of the nodes or links are in common.

Convergence is first calculated as follows:

$$\text{Convergence} = CH(Pi, Pj)/\text{MaxPathLength}(Pi, Pj)$$

where:
CH(Pi, Pj)=number of nodes, links, or nodes and links that are the same between paths Pi and Pj; and
MaxPathLength(Pi, Pj)=maximum path length of paths Pi, Pj.

The PDI value (also referred to as divergence) is calculated as follows:

$$PDI = 1 - \text{Convergence}$$
$$= 1 - [CH(Pi, Pj)/\text{Max}PathLength(Pi, Pj)]$$

If two paths Pi, Pj, have the same number of nodes and share the same nodes then CH=MaxPathLength which results in:
Convergence=1;
PDI=0.

If two paths have no common nodes then CH=0 and:
Convergence=0;
PDI=1.

An example of a general equation for path divergence for n paths compared k at a time is as follows:

$$PDI(n, k) = 1 - [(\text{sum of convergence over all combinations})/C\_n\_k];$$

where:
C_n_k=Total number of combinations=n!/k!(n−k)!

The following is an example of $PDI_n(n, k)$ calculation for the four paths shown in FIG. 2. In this example, the source node is not included in the node count. First, $PDI_n$ is calculated for each combination of paths using the PDI equation set forth above:

$$PDI_n 12 = 1 - 3/5 = 2/5$$

$$PDI_n 13 = 1 - 3/6 = 1/2$$

$$PDI_n 14 = 1 - 2/6 = 2/3$$

$$PDI_n 23 = 1 - 3/6 = 1/2$$

$$PDI_n 24 = 1 - 2/6 = 2/3$$

$$PDI_n 34 = 1 - 5/6 = 1/6$$

The sum of convergences over all combinations is then calculated as follows:

$$\Sigma\text{convergences} = 93/30 = 3.1$$

The total number of path combinations is:

$$C\_n\_k = 4!/2!(4-2)! = 6$$

The general path diversity index for all paths within the network is:

$$PDI_n(n, k) = 1 - (3.1/6) = 0.483$$

In the above example, $PDI_n 13$ is greater than $PDI_n 12$, but path 2 and path 3 are the same with respect to the number of common nodes. Therefore, if there is a problem on path 1, then the probability of the same problem on path 2 or path 3 is the same. If the problem is at nodes B or C, then the problem will not occur on path 2 or path 3. If the problem is at nodes D, E, or F, then the problem will also occur on path 2 and path 3 as well.

The following is an example of link diversity $PDI_l(n, k)$ using the paths shown in FIG. 2.

$$PDI_l 12 = 1 - 2/5 = 3/5$$

$$PDI_l 13 = 1 - 2/6 = 2/3$$

$$PDI_l 14 = 1 - 1/6 = 5/6$$

$$PDI_l 23 = 1 - 2/6 = 2/3$$

$$PDI_l 24 = 1 - 1/6 = 5/6$$

$$PDI_l 34 = 1 - 4/6 = 1/3$$

The sum of convergences over all combinations is then calculated as follows:

$$\Sigma\text{convergences} = 62/30 = 2.1$$

The total number of path combinations is:

$$C\_n\_k = 4!/2!(4-2)! = 6$$

The general path diversity index for all paths within the network is:

$$PDI_l(n, k) = 1 - (2.1/6) = 0.65$$

PDI(n, k) may be calculated for two or more networks and the values compared to determine which network is the most diverse, and therefore less susceptible to a reduction in quality of service (QoS) due to a single failure.

The path diversity index described above provides the diversity of any two paths, or combination of paths. It can be used for route selection in the case of selecting one network over another network. However, it does not provide a metric that can be used to select one path over another path. For path selection, the relative path diversity index (RPDI) is used.

RPDI provides a measure of least common nodes or links for a path Pk with respect to a current path Pi, as follows:

$$RPDIi,k = 1 - [CH(Pi, Pk)/\text{Max}(CH(Pi, P2), CH(Pi, P3), \ldots CH(Pi, Pn))]$$

where
k=[2, n]
n=number of paths

If Max(CH(Pi,P2), CH(Pi,P3), ... CH(Pi, Pn))=0 then all paths are completely diverse and RPDI=1.

Referring again to the sample paths of FIG. 2, the following is an example of $RPDI_n$ calculations for the combinations of path 1 with path 2, path 3, and path 4:

$$RPDI_n 12 = 1 - 3/3 = 0$$

$$RPDI_n 13 = 1 - 3/3 = 0$$

$$RPDI_n 14 = 1 - 2/3 = 0.33$$

Similar to the $PDI_n$ calculation above, the source node is not included in the number of common nodes.

$RPDI_n 12$ and $RPDI_n 13$ are the same because they share the same number of common nodes with path 1. $RPDI_n 14$ is the best $RPDI_n$ because path 4 shares only two nodes with path 1, as compared to paths 2 and 3, which share three nodes with path 1. Thus, if an alternate route is selected for path 1 based on node diversity, path 4 would be selected.

The following is an example of $RPDI_l$ calculations for the combinations of path 1 with path 2, path 3, and path 4, using the number of common links (rather than nodes):

$$RPDI_l 12 = 1 - 2/2 = 0$$

$$RPDI_l 13 = 1 - 2/2 = 0$$

$$RPDI_l 14 = 1 - 1/2 = 0.5$$

$RPDI_1 2$ and $RPDI_1 3$ are the same because they share the same number of common links with path 1. $RPDI_1 4$ is the best $RPDI_1$ because path 4 shares only one link with path 1, as compared to paths 2 and 3, which share two links with path 1. Thus, if an alternate route is selected for path 1 based on link diversity, path 4 would be selected.

As noted above, a combined path diversity index ($PDI_{n1}$, $RPDI_{n1}$) may also be calculated using the number of common nodes and links.

The PDI and RPDI equations may also take into account weights assigned to nodes or links based on the reliability of the nodes or links.

If two or more calculated RPDIs are close (e.g., within a specified range of one another), then more than one path can be selected as a suitable alternate path, based on diversity. For example, if more than one path is in a range of acceptable diversity (e.g., within 10% of best RPDI) then any of these paths may be selected. Other criteria may then be used to select an optimum route from the suitable paths.

The path diversity index calculation may be user initiated (e.g., show command) or may be based on an event (e.g., topology change, OIF update) or timer based. The event may be identified, for example, by the route control device, or it may be identified by a border router and a notification sent to the route control device.

Figure 5:
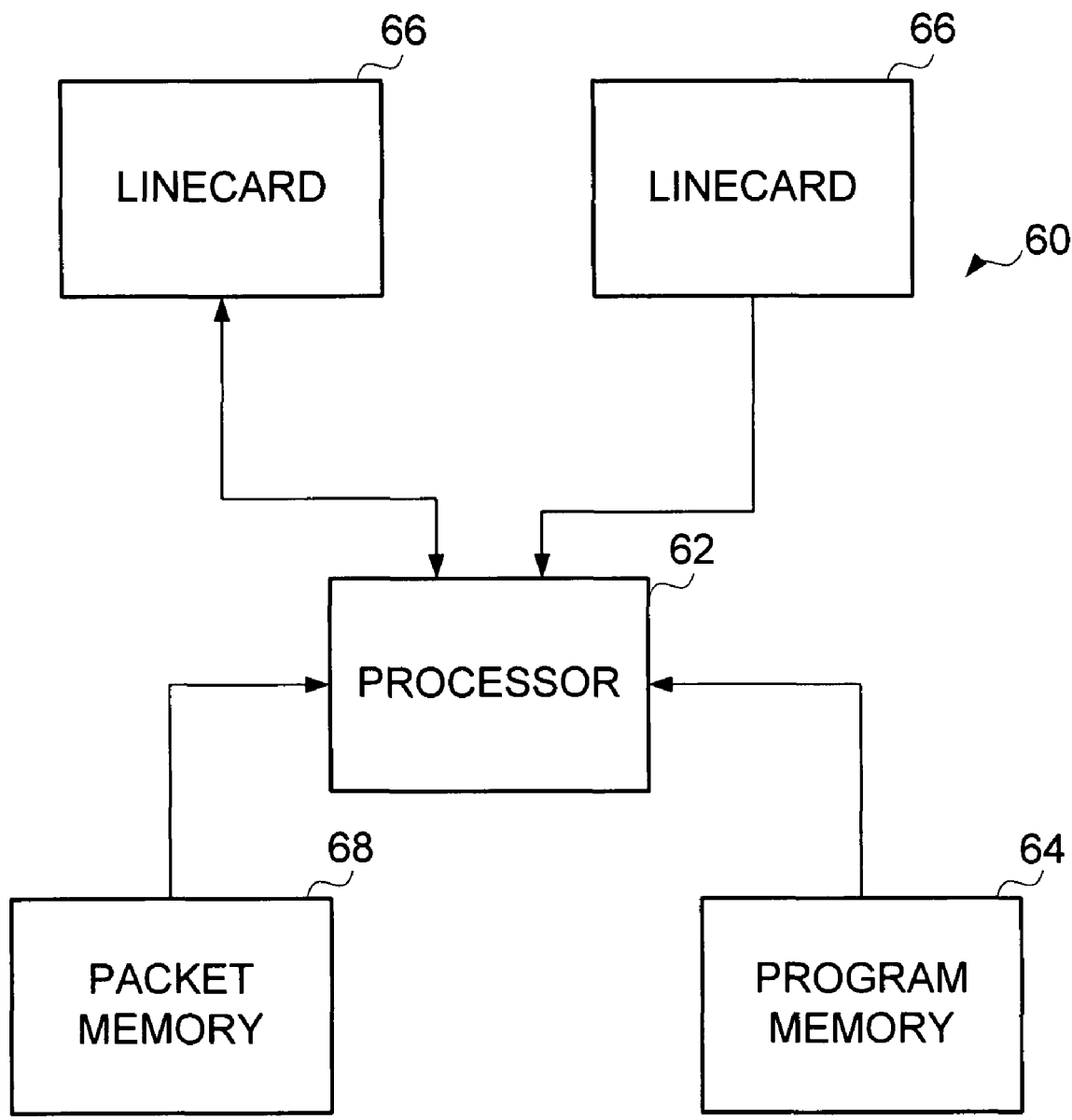
FIG. 5 depicts an example of a network device useful in implementing the embodiments described herein.

FIG. 5 depicts a network device 60 that may be used to implement the embodiments described herein. In one embodiment, network device 60 is a programmable machine that may be implemented in hardware, software, or any combination thereof. A processor 62 executes codes stored in a program memory 64. Program memory 64 is one example of a computer-readable medium. Program memory 64 can be a volatile memory. Another form of computer-readable medium storing the same codes would be some type of non-volatile storage such as floppy disks, CD-ROMs, DVD-ROMs, hard disks, flash memory, etc.

Network device 60 interfaces with physical media via a plurality of linecards 66. Any number of linecards 66 may be used and each linecard may include numerous separate physical interfaces. Linecards 66 may incorporate DSL interfaces, Ethernet interfaces, Gigabit Ethernet interfaces, 10-Gigabit Ethernet interfaces, Frame relay interfaces, ATM interfaces, SONET interfaces, dial-up interfaces, wireless interfaces, etc. The various components are interconnected by a backplane. As packets are received, processed, and forwarded by network device 60, they may be stored in a packet memory 68.

As can be observed from the foregoing, the system and method described herein provide numerous advantages. For example, the system and method provide a normalized path diversity index that can be used to compare paths having different lengths. The path diversity index can be used to mitigate the impact of failures. For example, the index can be taken into account when deciding how to route packets. A network wide diversity measurement can be used to indicate overall susceptibility to failures in the network.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method comprising:
    receiving at a network device information on paths to a destination node;
    determining a number of common nodes or links between at least two of said paths;
    identifying a path length for each of said paths and comparing said path lengths to find a maximum path length;
    dividing the number of common nodes or links by said maximum path length to calculate a path diversity index based on the number of common nodes or links; and
    calculating said path diversity index for each combination of paths within a network and dividing a summation of said path diversity index for each combination of paths by a number of path combinations to calculate a network wide diversity index.

2. The method of claim 1 wherein calculating said path diversity index comprises determining the number of common nodes or links for each combination of said paths.

3. The method of claim 1 wherein said information identifies all nodes receiving a packet transmitted from a source node and destined for the destination node and an order the packet transversed all of said nodes.

4. The method of claim 1 wherein said path diversity index is calculated at a route control device in communication with a plurality of border routers located on an edge of a network in which the route control device is located, and said information is received from said plurality of border routers.

5. The method of claim 1 further comprising:
    selecting a route to the destination node based on said path diversity index, wherein selecting a route comprises selecting a network.

6. The method of claim 1 wherein said path diversity index is equal to:

$$1 - [(\text{the number of common nodes or links})/(\text{the maximum path length})].$$

7. An apparatus comprising:
    a processor operable to receive information about paths between a source node and a destination node, determine a number of common nodes or links between a first path and each of a plurality of paths, calculate a relative path diversity index for each of said plurality of paths with respect to said first path, and select an alternate route for said first path based on said relative path diversity index; and
    memory for storing said path information and said relative path diversity index;
    wherein said relative path diversity index is calculated by dividing the number of common nodes or links between said first path and one of said plurality of paths by a maximum number of common nodes or links for all combinations of said first path and said plurality of paths.

8. The apparatus of claim 7 wherein said relative path diversity index is equal to:

$$1 - [(\text{the number of common nodes or links})/(\text{a maximum of the number of common nodes or links for all combinations of said paths})].$$

9. The apparatus of claim 7 wherein the processor is configured for operation at a route control device in communication with a plurality of border routers located on an edge of a content provider network and operable to transmit said information.

10. The apparatus of claim 7 wherein said relative path diversity index is between zero and one.

11. The apparatus of claim 7 wherein the processor is configured for calculating a network wide diversity index.

12. An apparatus comprising:
- means for receiving at a network device information on paths to a destination node;
- means for determining a number of common nodes or links between at least two of said paths, identifying a path length for each of said paths, and comparing said path lengths to find a maximum path length;
- means for calculating a path diversity index based on the number of common nodes or links, wherein means for calculating comprises means for dividing the number of common nodes or links by said maximum path length; and
- means for calculating said path diversity index for each combination of paths within a network and dividing a summation of said path diversity index for each combination of paths by a number of path combinations to calculate a network wide diversity index.

13. The apparatus of claim 12 wherein said path diversity index is equal to:

1−[(the number of common nodes or links)/(the maximum path length)].

14. The apparatus of claim 12 wherein said path diversity index is equal to:

1−[(the number of common nodes or links)/(a maximum path length)].

15. The apparatus of claim 12 wherein the network device is a route control device for communication with a plurality of border routers located at an edge of a network.

16. The apparatus of claim 12 wherein said information identifies all nodes receiving a packet transmitted from a source node and destined for the destination node and an order the packet transversed all of said nodes.

17. The apparatus of claim 12 wherein means for calculating said path diversity index comprises means for determining the number of common nodes or links for each combination of said paths.

* * * * *